US012634015B2

(12) United States Patent
Nakamura et al.

(10) Patent No.: US 12,634,015 B2
(45) Date of Patent: May 19, 2026

(54) OPTICAL TRANSMISSION SYSTEM, TRANSMISSION APPARATUS, RECEIVING APPARATUS AND METHOD FOR DEVICE CHARACTERISTIC ESTIMATION

(71) Applicant: NTT, Inc., Tokyo (JP)

(72) Inventors: Masanori Nakamura, Musashino (JP); Takeo Sasai, Musashino (JP); Etsushi Yamazaki, Musashino (JP); Yoshiaki Kisaka, Musashino (JP)

(73) Assignee: NTT, Inc., Tokyo (JP)

( * ) Notice: Subject to any disclaimer, the term of this patent is extended or adjusted under 35 U.S.C. 154(b) by 350 days.

(21) Appl. No.: 18/570,122

(22) PCT Filed: Jun. 23, 2021

(86) PCT No.: PCT/JP2021/023699
§ 371 (c)(1),
(2) Date: Dec. 14, 2023

(87) PCT Pub. No.: WO2022/269782
PCT Pub. Date: Dec. 29, 2022

(65) Prior Publication Data
US 2024/0283544 A1 Aug. 22, 2024

(51) Int. Cl.
*H04B 10/50* (2013.01)
*H04B 10/54* (2013.01)
(Continued)

(52) U.S. Cl.
CPC ............. *H04B 10/58* (2013.01); *H04B 10/54* (2013.01); *H04B 10/6971* (2013.01);
(Continued)

(58) Field of Classification Search
CPC .... H04B 10/58; H04B 10/54; H04B 10/6971; H04B 10/07; H04B 10/079; H04B 10/50;
(Continued)

(56) References Cited

U.S. PATENT DOCUMENTS 8,767,811 B2 * 7/2014 Zhong ............... H04L 25/03343
375/232
8,909,061 B1 * 12/2014 Varadarajan ....... H04B 10/6161
398/210
(Continued)

OTHER PUBLICATIONS

P. W. Berenguer et al., "Nonlinear Digital Pre-distortion of Transmitter Components", Journal of Lightwave Technology, vol. 34, No. 8, 2016, pp. 1739-1745.

(Continued)

*Primary Examiner* — Dibson J Sanchez
(74) *Attorney, Agent, or Firm* — Harness, Dickey & Pierce, P.L.C.

(57) ABSTRACT

A transmission apparatus causes a digital-to-analog conversion unit to perform digital-to-analog conversion on transmission signals pre-equalized by using a compensation filter, then converts electrical signals into optical signals, and outputs the optical signals. A receiving apparatus converts the received optical signals into received electrical signals, then performs analog-to-digital conversion, and demodulates the received signals. A scale estimation unit calculates a slope near an amplitude 0 in a correlation between an amplitude distribution of the pre-equalized transmission signals and an amplitude distribution of the received signals. A scale unit scales amplitude of the received signals on the basis of the calculated slope. A coefficient estimation unit calculates a filter coefficient of the compensation filter on the basis of the pre-equalized transmission signals and the scaled received signals. An output amplitude level determination unit determines output levels of the transmission signals from the digital-to-analog conversion unit on the basis of a correlation between distributions of amplitudes of non-pre-equalized and pre-equalized transmission signals.

6 Claims, 7 Drawing Sheets

(51) Int. Cl.

| | |
|---|---|
| *H04B 10/58* | (2013.01) |
| *H04B 10/69* | (2013.01) |
| *H04B 10/07* | (2013.01) |
| *H04B 10/079* | (2013.01) |

(52) U.S. Cl.

CPC ............ *H04B 10/07* (2013.01); *H04B 10/079* (2013.01); *H04B 10/50* (2013.01); *H04B 10/5057* (2013.01); *H04B 10/50572* (2013.01); *H04B 10/5059* (2013.01); *H04B 10/50593* (2013.01)

(58) Field of Classification Search

CPC .......... H04B 10/5057; H04B 10/50572; H04B 10/5059; H04B 10/50593; H04B 2210/254; H04B 10/2507

USPC ...................... 398/9–38, 140–172, 182–201

See application file for complete search history.

(56) References Cited

U.S. PATENT DOCUMENTS

| | | | | |
|---|---|---|---|---|
| 9,312,959 | B2 * | 4/2016 | Abe ................. | H04B 10/25137 |
| 9,628,189 | B2 * | 4/2017 | Châtelain ......... | H04B 10/25073 |
| 9,692,521 | B1 * | 6/2017 | Zhou .................... | H04B 10/532 |
| 9,819,520 | B1 * | 11/2017 | Huss ................. | H04L 25/03057 |
| 10,020,886 | B2 * | 7/2018 | Castro ................ | H04B 10/6163 |
| 10,069,590 | B1 * | 9/2018 | Wang .................... | H04B 10/50 |
| 10,341,027 | B2 * | 7/2019 | Huang ................. | H04B 10/564 |
| 10,608,746 | B2 * | 3/2020 | Zhuge ................... | H04B 10/40 |
| 11,736,202 | B2 * | 8/2023 | Yamanaka ........... | H04B 10/614 |
| | | | | 359/341.41 |
| 2004/0105682 | A1 * | 6/2004 | Roberts ............. | H04B 10/2572 |
| | | | | 398/147 |

| | | | | |
|---|---|---|---|---|
| 2010/0329325 | A1 * | 12/2010 | Mobin .............. | H04L 25/03343 |
| | | | | 375/232 |
| 2012/0170621 | A1 * | 7/2012 | Tracy ................ | H04L 25/03038 |
| | | | | 375/219 |
| 2013/0223849 | A1 * | 8/2013 | Whiteaway ........... | H04L 27/368 |
| | | | | 398/186 |
| 2014/0308047 | A1 * | 10/2014 | Mak ...................... | G02F 1/0123 |
| | | | | 359/279 |
| 2014/0341587 | A1 * | 11/2014 | Nakashima ........ | H04B 10/6162 |
| | | | | 398/115 |
| 2015/0037034 | A1 * | 2/2015 | Renaudier ........... | H04L 25/0288 |
| | | | | 398/79 |
| 2015/0063819 | A1 * | 3/2015 | Noguchi ............... | G02F 1/0121 |
| | | | | 398/188 |
| 2016/0094296 | A1 * | 3/2016 | Hongou ................ | H04B 10/58 |
| | | | | 398/25 |
| 2016/0164703 | A1 * | 6/2016 | Stone ................ | H04L 25/03343 |
| | | | | 398/140 |
| 2017/0026114 | A1 * | 1/2017 | Sugitani ........... | H04B 10/07953 |
| 2017/0222716 | A1 * | 8/2017 | Nakashima ........... | H04B 10/25 |
| 2018/0175933 | A1 * | 6/2018 | Nomura ................ | H04B 10/50 |
| 2020/0036440 | A1 * | 1/2020 | Yamagishi ............ | H04B 10/61 |
| 2020/0036446 | A1 * | 1/2020 | Ge ....................... | H04B 10/075 |
| 2020/0052794 | A1 * | 2/2020 | Noguchi ........... | H04L 25/03885 |
| 2020/0145112 | A1 * | 5/2020 | Wang .................... | H04B 10/532 |
| 2022/0029707 | A1 * | 1/2022 | Nakamura ............. | H04L 27/26 |
| 2022/0173807 | A1 * | 6/2022 | Yamagishi ............ | H04B 10/58 |
| 2022/0216923 | A1 * | 7/2022 | Matsushita ......... | H04B 10/077 |
| 2023/0006743 | A1 * | 1/2023 | Dmitry ............. | H04B 10/6164 |

OTHER PUBLICATIONS

T. Sasai et al., "Wiener-Hammerstein model and its learning for nonlinear digital predistortion of optical transmitters", Optics Express, vol. 28, No. 21, 2020, pp. 30952-30963.

* cited by examiner

OPTICAL TRANSMISSION SYSTEM, TRANSMISSION APPARATUS, RECEIVING APPARATUS AND METHOD FOR DEVICE CHARACTERISTIC ESTIMATION

CROSS-REFERENCE TO RELATED APPLICATIONS

This application is a 371 U.S. National Phase of International Application No. PCT/JP2021/023699, filed on Jun. 23, 2021. The entire disclosure of the above application is incorporated herein by reference.

TECHNICAL FIELD

The present invention relates to an optical transmission system, a transmission apparatus, a receiving apparatus and a method for characteristic estimation.

BACKGROUND ART

In order to generate a high-quality optical signal in an optical transmitter, compensation for nonlinearity occurring in a device has attracted attention. For the nonlinearity compensation, there have been proposed a method using a Volterra filter (see, for example, Non Patent Literature 1) and a method based on a Wiener-Hammerstein model (see, for example, Non Patent Literature 2).

CITATION LIST

Non Patent Literature

Non Patent Literature 1: P. W. Berenguer, et al., "Nonlinear Digital Pre-distortion of Transmitter Components," Journal of Lightwave Technology, Vol. 34, No. 8, pp. 1739-1745, 2016.
Non Patent Literature 2: T. Sasai, et al., "Wiener-Hammerstein model and its learning for nonlinear digital pre-distortion of optical transmitters," Optics Express, Vol. 28, No. 21, pp. 30952-30963, 2020.

SUMMARY OF INVENTION

Technical Problem

In the above conventional methods, an optical receiver analyzes a reception waveform of an optical signal to calculate a compensation coefficient, thereby feeding back the compensation coefficient to the optical transmitter. A level diagram of input and output in a compensation filter is important for compensation for a nonlinear response. In the optical transmitter, an electrical signal output from a digital-to-analog converter (DAC) is amplified by a driver amplifier, is converted into an optical signal by an optical modulator, and is then output to an optical transmission line. The optical signal transmitted through the optical transmission line is further amplified by an optical amplifier and is then input to the optical receiver. The optical receiver converts the input optical signal into an electrical signal and obtains a reception waveform of the electrical signal by using an analog-to-digital converter (ADC). In an actual optical transmitter/receiver, attenuation caused by an electric wire or the like occurs. Therefore, it is difficult to accurately obtain a level diagram necessary for calculating the compensation coefficient only on the basis of the waveform output from the ADC of the optical receiver and design information.

In view of the above circumstances, an object of the present invention is to provide an optical transmission system, a transmission apparatus, a receiving apparatus and a method for characteristic estimation, each of which is capable of accurately compensating an optical signal.

Solution to Problem

An aspect of the present invention is an optical transmission system including: a transmission apparatus; and a receiving apparatus, in which: the transmission apparatus includes a pre-equalization unit (hereinafter also referred to as "pre-equalizer") that performs pre-equalization on transmission signals by using a compensation filter, a digital-to-analog conversion unit (hereinafter also referred to as "digital-to-analog convertor") that converts the transmission signals which have been pre-equalized from digital signals into analog signals, and an output unit (hereinafter also referred to as "converter") that converts the transmission signals of the analog signals from electrical signals into optical signals and outputs the converted optical signals; the receiving apparatus includes a receiving unit (hereinafter also referred to as "receiver") that receives the optical signals which have been output from the output unit and converts the received optical signals into received signals of electrical signals, an analog-to-digital conversion unit (hereinafter also referred to as "analog-to-digital converter") that converts the received signals from the analog signals into the digital signals, and a demodulation unit (hereinafter also referred to as "demodulator") that demodulates the received signals of the digital signals; and the optical transmission system further includes a scale estimation unit (hereinafter also referred to as "scale estimation processor") that calculates a slope near an amplitude 0 in a correlation between an amplitude distribution of the transmission signals which have been pre-equalized by the pre-equalization unit and an amplitude distribution of the received signals of the digital signals, a scale unit (hereinafter also referred to as "scale processor") that scales an amplitude of the received signals of the digital signals on the basis of the slope which has been calculated by the scale estimation unit, a coefficient estimation unit (hereinafter also referred to as "coefficient estimation processor") that calculates a filter coefficient of the compensation filter on the basis of the transmission signals which have been pre-equalized by the pre-equalization unit and the received signals which have been scaled by the scale unit, and an output amplitude level determination unit (hereinafter also referred to as "output amplitude level determination processor") that determines an output level of the transmission signals from the analog-to-digital conversion unit on the basis of a correlation between a distribution of amplitudes of the transmission signals which have been input to the pre-equalization unit and a distribution of amplitudes of the transmission signals which have been pre-equalized by the pre-equalization unit.

An aspect of the present invention is a transmission apparatus including: a pre-equalization unit that performs pre-equalization on transmission signals by using a compensation filter; a digital-to-analog conversion unit that converts the transmission signals which have been pre-equalized from digital signals into analog signals; an output unit that converts the transmission signals of the analog signals from electrical signals into optical signals and outputs the converted optical signals; and an output amplitude level determination unit that determines output levels of the transmission signals output from the digital-to-analog conversion unit on the basis of a correlation between a distribution of amplitudes of the transmission signals which have been input to the pre-equalization unit and a distribution of amplitudes of the transmission signals pre-equalized by the which have been pre-equalization unit.

An aspect of the present invention is a receiving apparatus including: a conversion unit that receives optical signals which have been output from a transmission apparatus and converts the received optical signals into received signals of electrical signals; an analog-to-digital conversion unit that converts the received signals from analog signals into digital signals; a demodulation unit that demodulates the received signals of the digital signals; a scale estimation unit that calculates a slope near an amplitude 0 in a correlation between an amplitude distribution of transmission signals which have been pre-equalized by a pre-equalization unit of the transmission apparatus by using a compensation filter and an amplitude distribution of the received signals of the digital signals; a scale unit that scales an amplitude of the received signals of the digital signals on the basis of the slope which has been calculated by the scale estimation unit; and a coefficient estimation unit that calculates a filter coefficient of the compensation filter on the basis of the transmission signals which have been pre-equalized by the pre-equalization unit and the received signals which have been scaled by the scale unit.

An aspect of the present invention is a method for device characteristic estimation performed by an optical transmission system including a transmission apparatus and a receiving apparatus for optical signals, the method for device characteristic estimation including: a pre-equalization step of the transmission apparatus performing pre-equalization on transmission signals by using a compensation filter; a digital-to-analog conversion step of the transmission apparatus converting the transmission signals which have been pre-equalized from digital signals into analog signals; an output step of the transmission apparatus converting the transmission signals of the analog signals from electrical signals into optical signals and outputting the converted optical signals; a receiving step of the receiving apparatus receiving the optical signals which have been output in the output step and converting the received optical signals into received signals of electrical signals; an analog-to-digital conversion step of the receiving apparatus converting the received signals from analog signals into digital signals; a demodulation step of the receiving apparatus demodulating the received signals of the digital signals; a scale estimation step of the optical transmission system calculating a slope near an amplitude 0 in a correlation between an amplitude distribution of the transmission signals which have been pre-equalized in the pre-equalization step and an amplitude distribution of the received signals of the digital signals; a scale step of the optical transmission system scaling an amplitude of the received signals of the digital signals on the basis of the slope which has been calculated in the scale estimation step; a coefficient estimation step of the optical transmission system calculating a filter coefficient of the compensation filter on the basis of the transmission signals which have been pre-equalized in the pre-equalization step and the received signals which have been scaled in the scale step; and an output amplitude level determination step of the optical transmission system determining output levels of the transmission signals subjected to the analog-to-digital conversion step on the basis of a correlation between a distribution of amplitudes of the transmission signals which have not been pre-equalized in the pre-equalization step and a distribution of amplitudes of the transmission signals which have been pre-equalized in the pre-equalization step.

Advantageous Effects of Invention

The present invention can accurately compensate an optical signal.

DESCRIPTION OF EMBODIMENTS

Hereinafter, embodiments of the present invention will be described in detail with reference to the drawings. The present embodiments relate to estimation of a coefficient of a nonlinear compensation filter and digital pre-equalization in an optical transmission system.

First Embodiment

Figure 1:
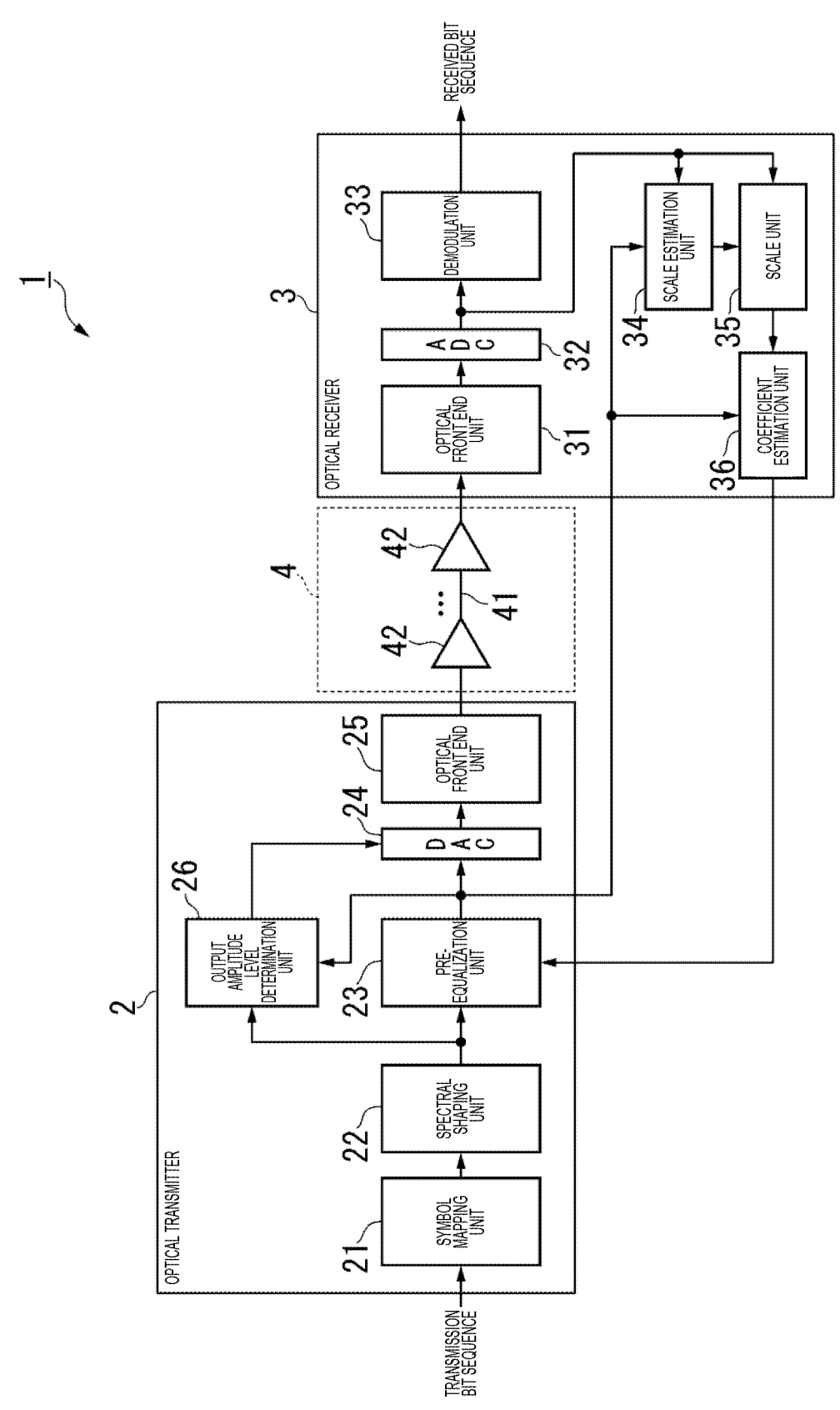
FIG. 1 shows a configuration of an optical transmission system according to a first embodiment of the present invention.

FIG. 1 shows a configuration of an optical transmission system 1 according to a first embodiment. The optical transmission system 1 includes an optical transmitter 2 and an optical receiver 3. The optical transmitter 2 and the optical receiver 3 are connected by an optical transmission line 4.

The optical transmitter 2 includes a symbol mapping unit 21, a spectral shaping unit 22, a pre-equalization unit 23, a digital-to-analog converter (DAC) 24, an optical front end unit 25, and an output amplitude level determination unit 26.

The symbol mapping unit 21 encodes a transmission bit sequence to generate a transmission signal and maps the generated transmission signal to a symbol. The spectral shaping unit 22 samples the transmission signal mapped to the symbol, thereby shaping a spectrum (waveform) of the transmission signal.

The pre-equalization unit 23 compensates distortion of the waveform of the transmission signal whose spectrum has been shaped by the spectral shaping unit 22 by digital signal processing and outputs the transmission signal whose distortion has been compensated to the DAC 24. A conventional technique is used for the processing of the pre-equalization unit 23. For example, a Volterra filter or a nonlinear compensation filter based on a Wiener-Hammerstein model can be used.

The DAC 24 converts the transmission signal compensated by the pre-equalization unit 23 from a digital signal into an analog signal and outputs the converted analog signal to the optical front end unit 25. The optical front end unit 25 converts the transmission signal output from the DAC 24 from an electrical signal into an optical signal. For example, the optical front end unit 25 amplifies the transmission signal output from the DAC 24 by using a driver amplifier (not shown) and drives an optical modulator (not shown) by using the amplified transmission signal. The optical modulator converts the transmission signal of the analog signal into an optical signal and thus generates an optical signal. The optical front end unit 25 outputs the generated optical signal to the optical transmission line 4.

The output amplitude level determination unit 26 determines an output amplitude level on the basis of a correlation between amplitude distributions of non-pre-equalized and pre-equalized signals and issues an instruction on the determined output amplitude level to the DAC 24. The DAC 24 sets an amplitude of the analog signal to be output at the output amplitude level issued from the output amplitude level determination unit 26.

The optical receiver 3 includes an optical front end unit 31, an analog-to-digital converter (ADC) 32, a demodulation unit 33, a scale estimation unit 34, a scale unit 35, and a coefficient estimation unit 36.

The optical front end unit 31 receives the optical signal transmitted through the optical transmission line 4 and converts the received optical signal into a received signal of an electrical signal. The optical front end unit 31 extracts a received signal in a predetermined band by using a band pass filter (not shown), amplifies the extracted received signal by using a linear amplifier (not shown) such as a transimpedance amplifier, and outputs the amplified received signal to the ADC 32. The ADC 32 converts the received signal input from the optical front end unit 31 from the analog signal into a digital signal and outputs the converted digital signal to the demodulation unit 33.

The demodulation unit 33 receives the received signal of the digital signal from the ADC 32. The demodulation unit 33 obtains a received bit sequence by performing digital signal processing on the input received signal. Specifically, the demodulation unit 33 performs, on the received signal, compensation for a frequency characteristic in the optical front end unit 31 and compensation for wavelength dispersion received in the optical transmission line 4. The demodulation unit 33 performs equalization processing on the compensated electrical signal. The demodulation unit 33 determines a symbol of the received signal subjected to the equalization processing and converts the determined symbol into binary data. The demodulation unit 33 decodes the demapped binary data to obtain a received bit sequence.

The scale estimation unit 34 calculates a slope near an amplitude 0 in a correlation between an amplitude distribution of the transmission signals output from the pre-equalization unit 23 of the optical transmitter 2 and an amplitude distribution of the received signals output from the ADC 32. The scale unit 35 scales the amplitude of the received signal by using the slope calculated by the scale estimation unit 34. The coefficient estimation unit 36 calculates a value of a filter coefficient in the pre-equalization unit 23 of the optical transmitter 2 by using the transmission signal output from the pre-equalization unit 23 of the optical transmitter 2 and the received signal scaled by the scale unit 35. The coefficient estimation unit 36 notifies the optical transmitter 2 of the calculated value of the filter coefficient. The pre-equalization unit 23 of the optical transmitter 2 compensates the transmission signal by using the value issued from the coefficient estimation unit 36 as a coefficient of the nonlinear compensation filter issued from the coefficient estimation unit 36.

The optical transmission line 4 transmits the optical signal output from the optical transmitter 2 to the optical receiver 3. The optical transmission line 4 includes an optical fiber 41 and an optical amplifier 42. The optical fiber 41 connects the optical transmitter 2 or the optical amplifier 42 in the preceding stage to the optical amplifier 42 in the subsequent stage or the optical receiver 3. The optical amplifier 42 amplifies the optical signal transmitted through the optical fiber 41 on the input side and inputs the amplified optical signal to the optical fiber 41 on the output side. The number of optical amplifiers 42 is arbitrary.

Next, processing regarding compensation in the optical transmission system 1 will be described.

Figure 2:
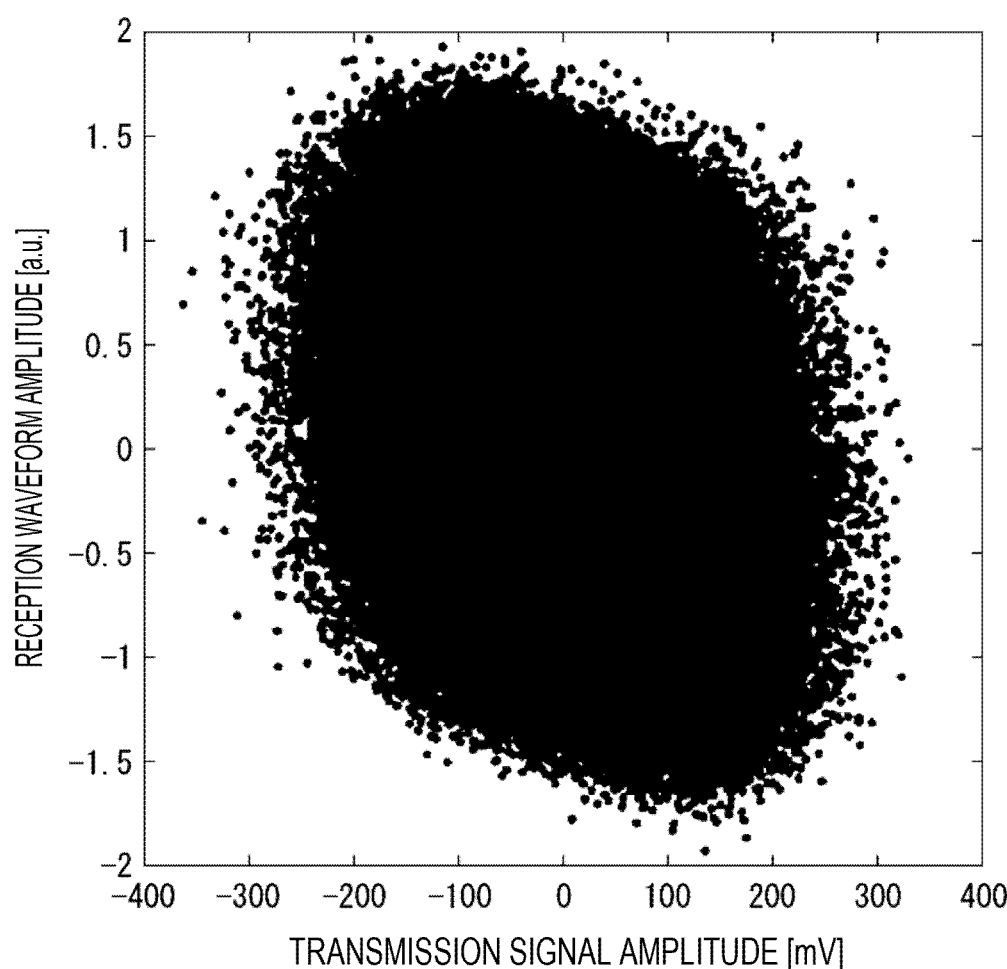
FIG. 2 shows a correlation between a time waveform of transmission signals and a time waveform of received signals in the optical transmission system according to the embodiment.

FIG. 2 shows a correlation between a time waveform of the transmission signals from the optical transmitter 2 and a time waveform of the received signals in the optical receiver 3. The vertical axis represents an amplitude of a received signal waveform, and the horizontal axis represents an amplitude of a transmission signal waveform. A waveform of N transmission signals is denoted by S $(0, 1, 2, \ldots, N-1)$, and a waveform of N received signals is denoted by R$(0, 1, 2, \ldots, N-1)$. An amplitude of a waveform S $(i)$ of the transmission signals is defined as a transmission signal amplitude Sa(i), and an amplitude of a waveform R(i) of the received signals is defined as a reception waveform amplitude Ra(i) (i is an integer of 0 or more and N-1 or less). FIG. 2 plots {vertical axis, horizontal axis}: {Ra (0), Sa(0)}, {Ra(1), Sa(1)}, . . . , and {Ra (N-1), Sa (N-1)}. It can be seen from FIG. 2 that the correlation between the time waveforms of the transmission signals and the received signals cannot be used for calculating the compensation coefficient, for example, because the waveforms change due to a linear transfer function in a device band or the like.

The optical transmitter 2 according to the present embodiment outputs, to the optical receiver 3, transmission waveform information indicating the waveform of the transmission signals output from the pre-equalization unit 23 to the DAC 24. The scale estimation unit 34 and the coefficient estimation unit 36 of the optical receiver 3 receive the transmission waveform information from the optical transmitter 2. The scale estimation unit 34 further acquires reception waveform information indicating the waveform of the received signals output from the ADC 32. The scale estimation unit 34 correlates the amplitude distribution of the transmission signals with the amplitude distribution of the received signals. Specifically, the scale estimation unit 34 sorts amplitudes of the transmission signals and amplitudes of the received signals for one frame in ascending order. The scale estimation unit 34 correlates a histogram of the amplitudes of the transmission signals obtained by the sort with a histogram of the amplitudes of the received signals obtained by the sort.

Figure 3:
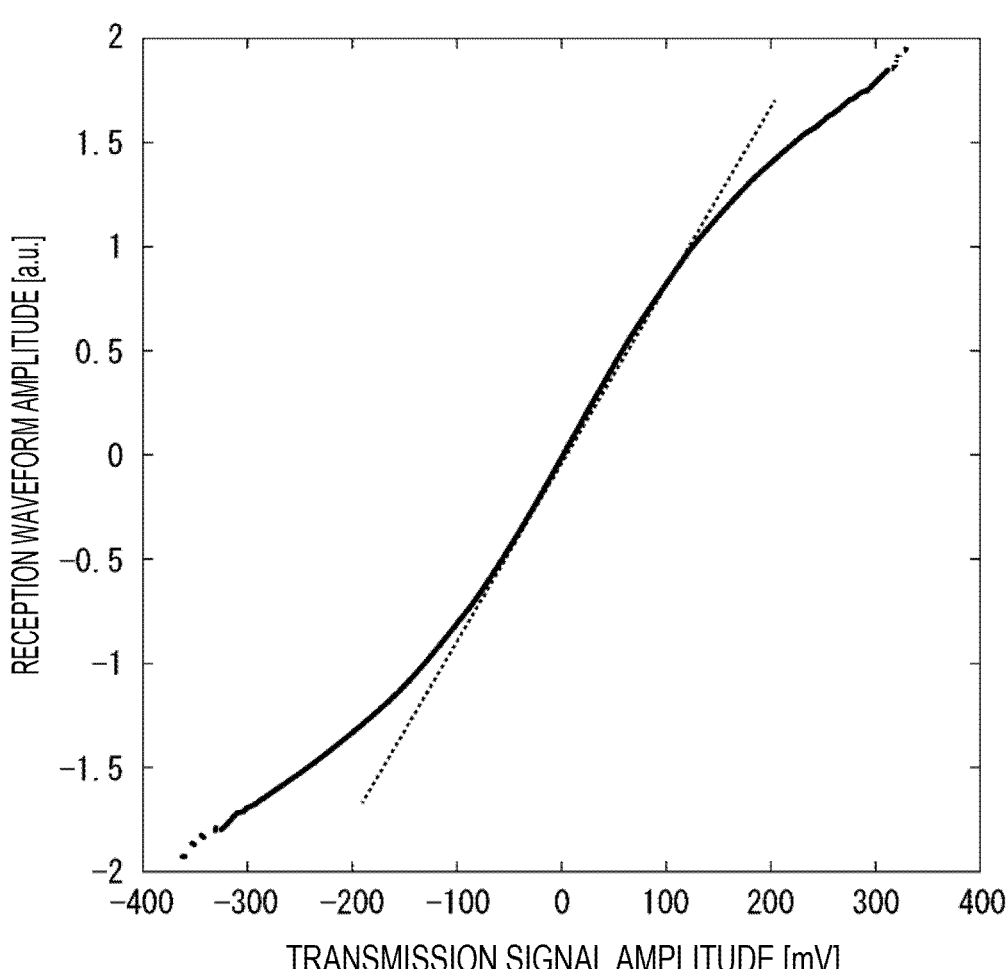
FIG. 3 shows a correlation between an amplitude distribution of transmission signals and an amplitude distribution of received signals in the optical transmission system according to the embodiment.

FIG. 3 shows the correlation between the amplitude distribution of the transmission signals and the amplitude distribution of the received signals calculated by the scale estimation unit 34. The waveform of the N transmission signals for one frame indicated by the transmission waveform information received by the scale estimation unit 34 is denoted by S $(0, 1, 2, \ldots, N-1)$. The waveform of the N received signals for one frame indicated by the reception waveform information acquired by the scale estimation unit 34 is denoted by R(0, 1, 2, . . . , N–1). The scale estimation unit 34 rearranges the waveform of the N transmission signals and the waveform of the N received signals in ascending order of amplitude. The waveform of the rearranged transmission signals is denoted by S'(0, 1, 2, . . . , N–1), and the waveform of the rearranged received signals is denoted by R'(0, 1, 2, . . . , N–1). An amplitude of a waveform S'(i) of the transmission signals is defined as a transmission signal amplitude Sa'(i), and an amplitude of a waveform R'(i) of the received signals is defined as a reception waveform amplitude Ra'(i) (i is an integer of 0 or more and N–1 or less). FIG. 3 plots {vertical axis, horizontal axis}: {Ra'(0), Sa'(0)}, {Ra'(1), Sa'(1)}, . . . and {Ra'(N–1), Sa'(N–1)}. The scale estimation unit 34 calculates a slope near the origin (0, 0), that is, near an amplitude of 0 mV in the correlation. The scale estimation unit 34 outputs a reciprocal of the calculated slope to the scale unit 35.

The scale unit 35 acquires the received signal output from the ADC 32. The scale unit 35 further receives the value output from the scale estimation unit 34 and multiplies the received signal by the received value. The scale unit 35 outputs the multiplied received signal to the coefficient estimation unit 36.

The coefficient estimation unit 36 calculates the coefficient of the nonlinear compensation filter by using the signal waveform of the received signals for one frame input from the scale unit 35 and the signal waveform of the transmission signals for one frame indicated by the transmission waveform information received from the optical transmitter 2. For example, the coefficient estimation unit 36 calculates a coefficient of a general nonlinear compensation filter by using a conventional technique such as a least squares method, a least mean square (LMS) algorithm, or a recursive least squares (RLS) algorithm. The coefficient estimation unit 36 notifies the optical transmitter 2 of a calculated value of the coefficient of the nonlinear compensation filter. The pre-equalization unit 23 of the optical transmitter 2 receives the value of the coefficient of the nonlinear compensation filter from the coefficient estimation unit 36 of the optical receiver 3 and compensates the transmission signal by using the received value as the coefficient of the nonlinear compensation filter.

Meanwhile, the output amplitude level determination unit 26 of the optical transmitter 2 acquires the transmission signal output from the spectral shaping unit 22 to the pre-equalization unit 23 as a non-pre-equalized transmission signal and acquires the transmission signal output from the pre-equalization unit 23 to the DAC 24 as a pre-equalized transmission signal. The output amplitude level determination unit 26 determines an output level of the DAC 24 on the basis of a non-pre-equalized and pre-equalized signal waveform amplitude distribution.

Figure 4:
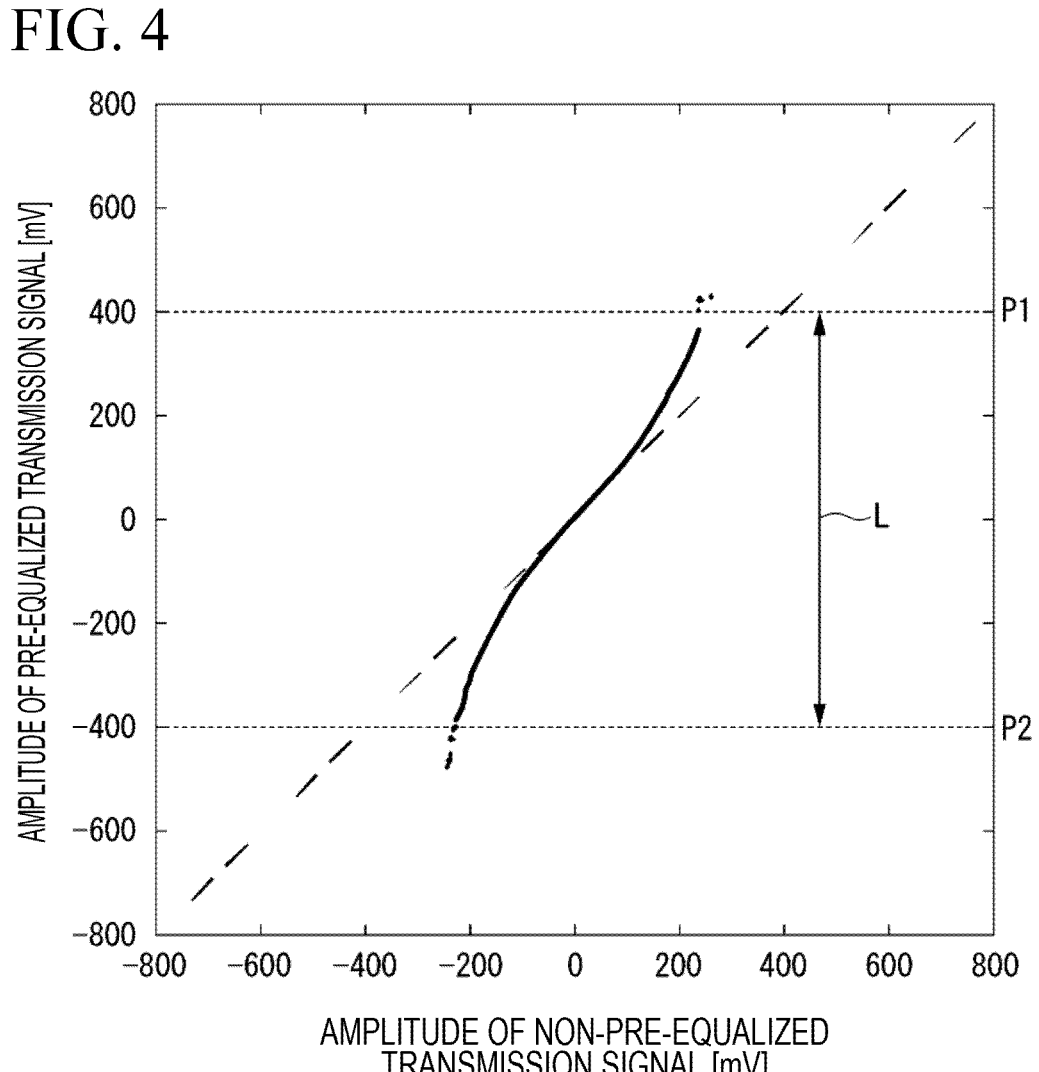
FIG. 4 shows a relationship between an amplitude of a non-pre-equalized transmission signal and an amplitude of a pre-equalized transmission signal in an optical transmitter according to the embodiment.

FIG. 4 shows a relationship between the amplitude of the non-pre-equalized transmission signal and an amplitude of the pre-equalized transmission signal in the optical transmitter 2. FIG. 4 shows a relationship in a case where the DAC 24 is driven at 400 mVpp (volt peak to peak). Amplitudes of N non-pre-equalized transmission signals output from the spectral shaping unit 22 are denoted by u(0, 1, 2, . . . , N–1). Amplitudes of N pre-equalized transmission signals output from the pre-equalization unit 23 are denoted by v(0, 1, 2, . . . , N–1). The output amplitude level determination unit 26 rearranges the amplitudes of the N non-pre-equalized transmission signals and the amplitudes of the N pre-equalized transmission signals in ascending order. The rearranged amplitudes of the non-pre-equalized transmission signals are denoted by u'(0, 1, 2, . . . , N–1), and the rearranged amplitudes of the pre-equalized transmission signals are denoted by v'(0, 1, 2, . . . , N–1). FIG. 4 plots {vertical axis, horizontal axis}: {u'(0), v'(0)}, {u'(1), v'(1)}, . . . , and {u'(N–1), v'(N–1)}.

The output amplitude level determination unit 26 generates, for each value of Vpp, signal waveform amplitude distribution information indicating the relationship between the amplitude of the non-pre-equalized transmission signal and the amplitude of the pre-equalized transmission signal as shown in FIG. 4. The output amplitude level determination unit 26 determines an output amplitude of the DAC 24 for each value of Vpp as follows on the basis of the signal waveform amplitude distribution information.

That is, the output amplitude level determination unit 26 acquires, as an amplitude level, a range of the amplitudes of the non-pre-equalized transmission signals corresponding to a range L in which all or a predetermined ratio or more of the amplitudes of the pre-equalized transmission signals exists on the vertical axis in FIG. 4. Specifically, the output amplitude level determination unit 26 sets a range between points of maximum output amplitudes of the pre-equalized transmission signals as the range L. Alternatively, the output amplitude level determination unit 26 may set, as DAC maximum amplitudes, values P1 and P2 that specify a predetermined range of X % (X is a real number) within a range in which the correlation between the amplitude distributions of the non-pre-equalized and pre-equalized transmission signals can be regarded as a straight line having a slope of 1. That is, the range L is a range between the value P1 and the value P2.

The output amplitude level determination unit 26 sets the acquired amplitude level within the range L as the output amplitude of the DAC 24. The DAC 24 converts the transmission signal of the digital signal output from the pre-equalization unit 23 into the analog transmission signal of the amplitude level set by the output amplitude level determination unit 26 and outputs the analog transmission signal.

Figure 5:
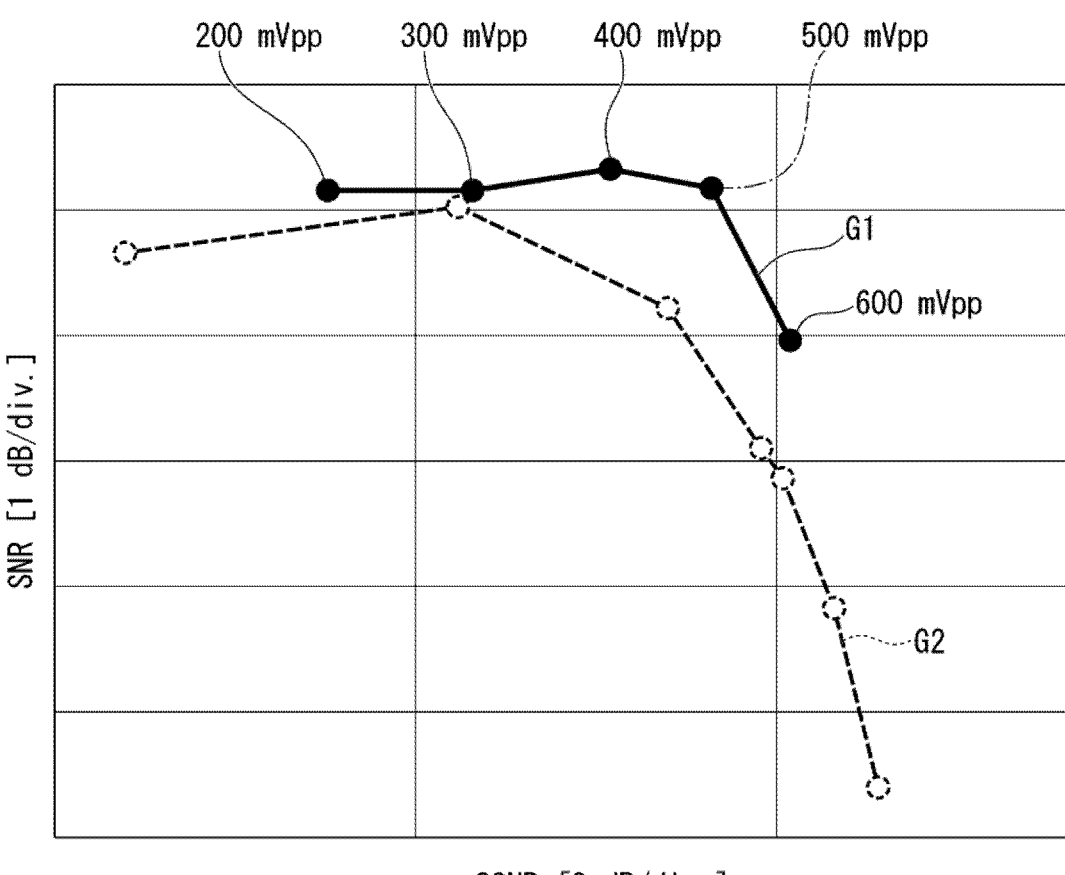
FIG. 5 shows a result of an experiment using the optical transmission system according to the embodiment.

FIG. 5 shows a result of an experiment using the optical transmission system 1 according to the present embodiment. In the experiment, 8 GBd×8 subcarrier signals were transmitted while the output amplitude of the DAC 24 in the optical transmitter 2 was changed to 200, 300, 400, 500, and 600 mVpp. FIG. 5 shows an optical signal to noise ratio (OSNR) and a signal to noise ratio (SNR) measured in the optical transmission system 1. The OSNR represents a ratio of optical signal power to noise power, and the SNR represents waveform consistency. For comparison, FIG. 5 also shows a result of an experiment using a conventional optical transmission system that does not perform nonlinear compensation. A reference sign G1 indicates a result of the experiment of the optical transmission system 1 according to the present embodiment, and a reference sign G2 indicates a result of the experiment of the conventional optical transmission system. As the DAC output amplitude increases, optical power output from the modulator increases, and thus the OSNR is improved as indicated by the reference sign G2. However, the waveform consistency between the transmission signal and the received signal is deteriorated due to nonlinearity of the device. According to the present embodiment, it can be seen that the waveform consistency is improved while the OSNR is improved.

Second Embodiment

An optical transmission system according to a second embodiment clips an amplitude of a level exceeding a DAC output amplitude of an optical transmitter. In the second embodiment, differences from the first embodiment will be mainly described.

Figure 6:
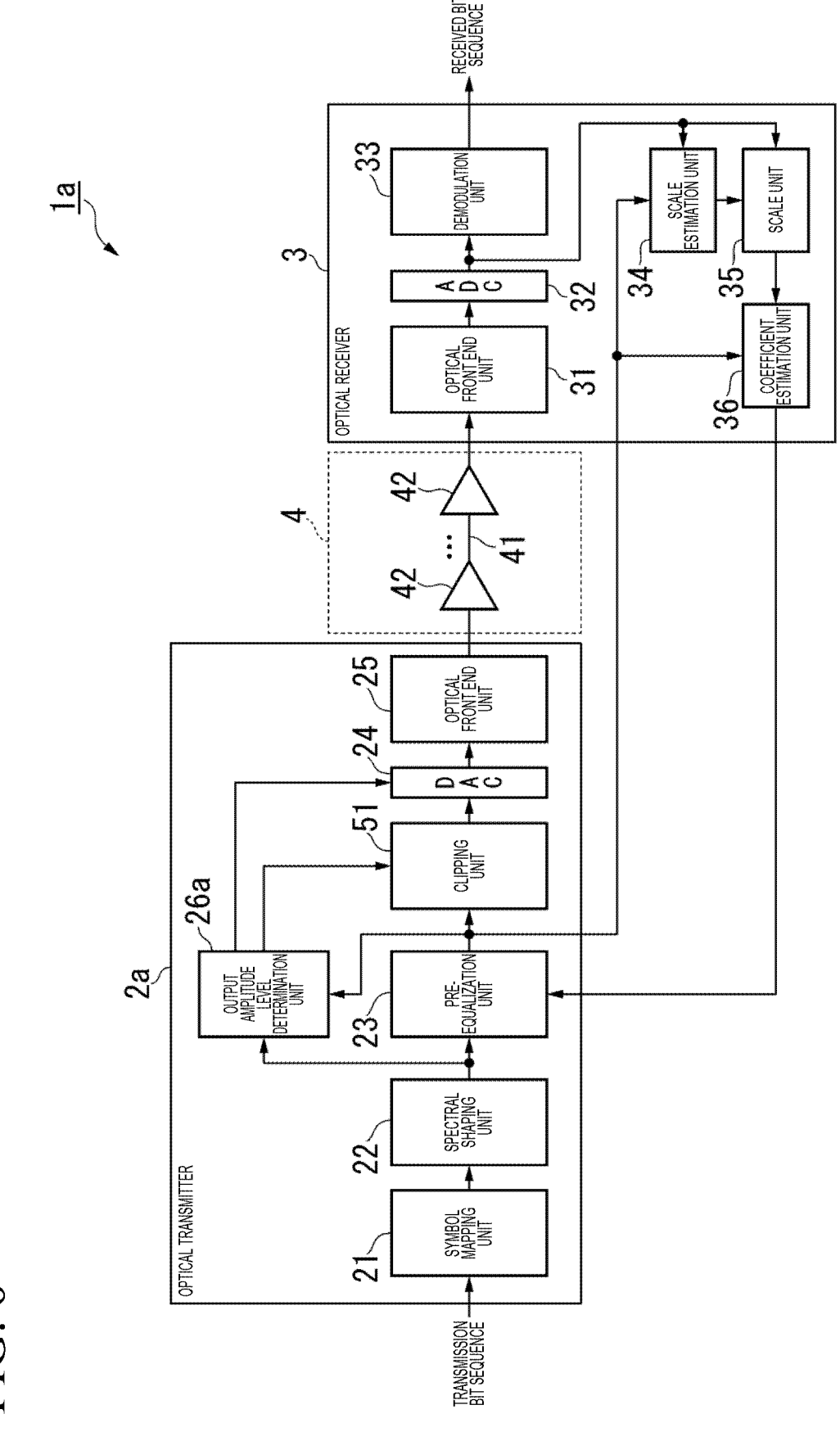
FIG. 6 shows a configuration of an optical transmission system according to a second embodiment.

FIG. 6 shows a configuration of an optical transmission system 1*a* according to the second embodiment. The optical transmission system 1*a* in FIG. 6 is different from the optical transmission system 1 of the first embodiment in FIG. 1 in that the optical transmission system 1*a* includes an optical transmitter 2*a* instead of the optical transmitter 2. The optical transmitter 2*a* is different from the optical transmitter 2 in FIG. 1 in that the optical transmitter 2*a* includes an output amplitude level determination unit 26*a* instead of the output amplitude level determination unit 26 and further includes a clipping unit (hereinafter also referred to as "clipper") 51.

The output amplitude level determination unit 26*a*, as well as the output amplitude level determination unit 26 of the first embodiment, generates signal waveform amplitude distribution information for each value of Vpp. The output amplitude level determination unit 26*a* may set, as the DAC maximum amplitudes, that is, as the range L, the values P1 and P2 (P1>0, P2<0) that specify a predetermined clipping rate of X % (X is a real number) within a range in which the correlation between the amplitude distributions of the non-pre-equalized and pre-equalized transmission signals can be regarded as a straight line having a slope of 1. The output amplitude level determination unit 26*a* sets the amplitude level within the range L as the output amplitude to the DAC 24. Further, the output amplitude level determination unit 26*a* sets the value P1 and the value P2 as clipping points. The output amplitude level determination unit 26*a* outputs the clipping points to the clipping unit 51.

The clipping unit 51 receives a transmission signal subjected to the pre-equalization processing from the pre-equalization unit 23. The clipping unit 51 clips the input transmission signal by using the clipping points issued from the output amplitude level determination unit 26*a*. That is, the clipping unit 51 sets the amplitude to the value P1 in a case where the amplitude is a positive value and the magnitude of the amplitude exceeds the value P1 and sets the amplitude to the value P2 in a case where the amplitude is a negative value and the magnitude of the amplitude exceeds the value P2. The clipping unit 51 outputs the clipped transmission signal to the DAC 24.

Third Embodiment

An optical transmission system according to a third embodiment performs control such that a clipping rate in a DAC of an optical transmitter becomes a desired value (e.g. 0.1 or less). In the third embodiment, differences from the second embodiment will be mainly described.

Figure 7:
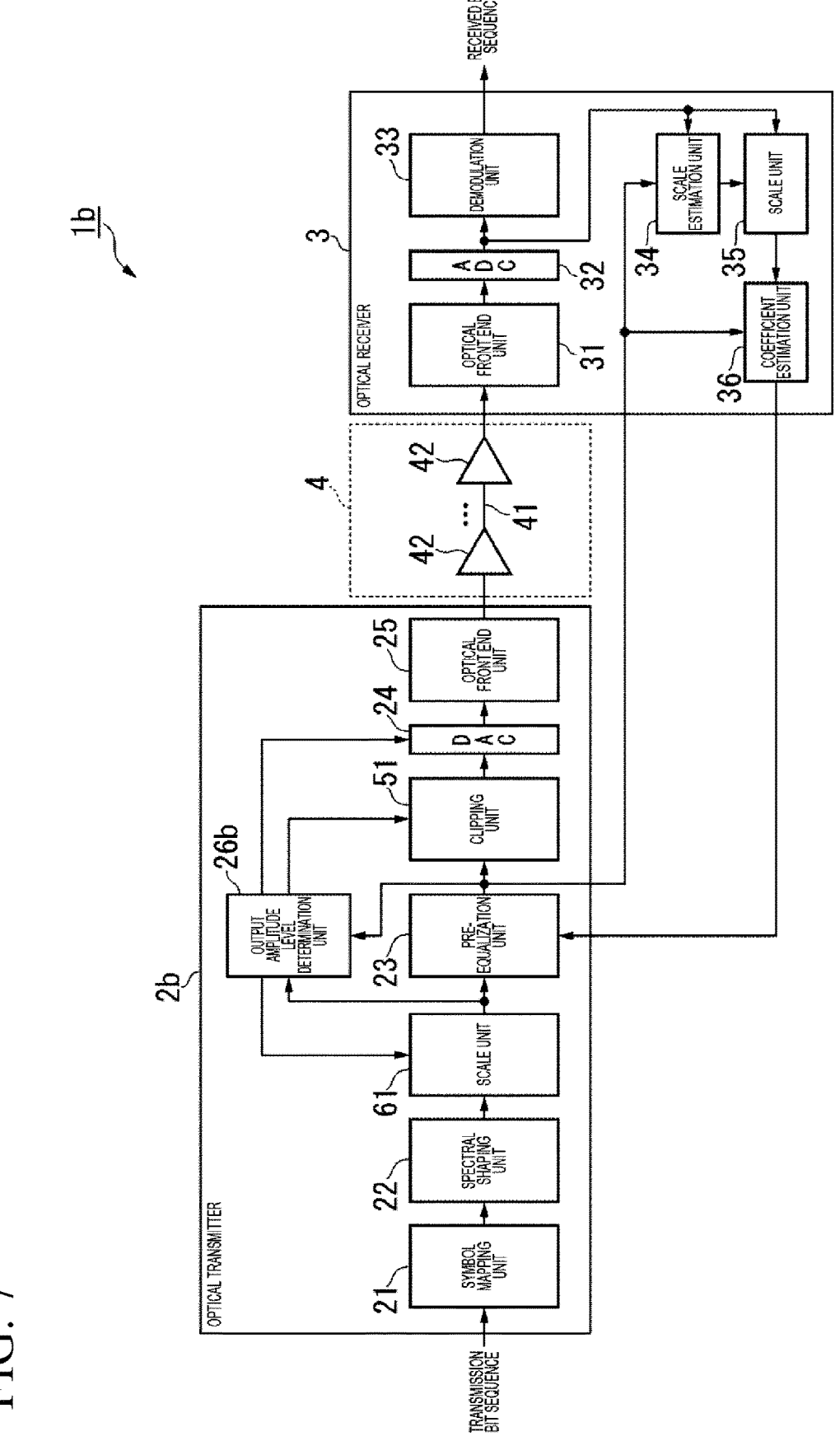
FIG. 7 shows a configuration of an optical transmission system according to a third embodiment.

FIG. 7 shows a configuration of an optical transmission system 1*b* according to the third embodiment. The optical transmission system 1*b* in FIG. 7 is different from the optical transmission system 1*a* of the second embodiment in FIG. 6 in that the optical transmission system 1*b* includes an optical transmitter 2*b* instead of the optical transmitter 2*a*. The optical transmitter 2*b* is different from the optical transmitter 2*a* in FIG. 6 in that the optical transmitter 2*b* includes an output amplitude level determination unit 26*b* instead of the output amplitude level determination unit 26*a* and further includes a scale unit 61.

The output amplitude level determination unit 26*b*, as well as the output amplitude level determination unit 26*a* of the second embodiment, sets the output amplitude of the DAC 24 and outputs the clipping points to the clipping unit

51. The output amplitude level determination unit 26*b* further determines a magnification according to the output amplitude and issues an instruction on the determined magnification to the scale unit 61. The scale unit 61 multiplies a transmission signal output from the spectral shaping unit 22 by the magnification issued from the output amplitude level determination unit 26*b* and outputs the multiplied transmission signal to the pre-equalization unit 23.

When the magnification of the scale unit 61 is increased, the amplitude of the transmission signal output from the scale unit 61 is increased. However, a difference between a minimum value and a maximum value of the amplitude necessary for the nonlinear compensation performed by the pre-equalization unit 23 exponentially increases. Therefore, the output amplitude level determination unit 26*b* performs control so as to optimize a trade-off between improvement in SNR caused by an increase in amplitude, a quantization error caused by the DAC 24, and an influence of the clipping. The output amplitude level determination unit 26*b* uses not only the output amplitude but also bit error rates of a transmission bit sequence and a received bit sequence and the waveform consistency between a transmission waveform and a reception waveform in an objective function for determining control values (magnification and clipping rate X) for performing the above control.

According to the above embodiments, the optical transmission system can accurately estimate a level diagram necessary for calculating the compensation coefficient, thereby improving the SNR by using the estimation result.

In the above description, the optical transmitter 2, 2*a*, or 2*b* includes the output amplitude level determination unit 26, 26*a*, or 26*b*. However, an output amplitude level setting device, which is an external apparatus of the optical transmitter 2, 2*a*, or 2*b*, may include the output amplitude level determination unit 26, 26*a*, or 26*b*. Further, in the above description, the optical receiver 3 includes the scale estimation unit 34, the scale unit 35, and the coefficient estimation unit 36. However, a coefficient setting apparatus, which is an external device of the optical receiver 3, may include all or some of the scale estimation unit 34, the scale unit 35, and the coefficient estimation unit 36. The output amplitude level setting apparatus and the coefficient setting apparatus may be integrated.

All or some of the functions of the output amplitude level determination unit 26, 26*a*, or 26*b* of the optical transmitter 2, 2*a*, or 2*b* and the scale estimation unit 34, the scale unit 35, and the coefficient estimation unit 36 of the optical receiver 3 may be implemented by using hardware such as an application specific integrated circuit (ASIC), a programmable logic device (PLD), or a field programmable gate array (FPGA). Alternatively, all or some of the functions of the output amplitude level determination unit 26, 26*a*, or 26*b* of the optical transmitter 2, 2*a*, or 2*b* and the scale estimation unit 34, the scale unit 35, and the coefficient estimation unit 36 of the optical receiver 3 may be implemented by a processor such as a central processing unit (CPU) reading a program from a storage unit and executing the program.

According to the above embodiments, the optical transmission system includes a transmission apparatus and a receiving apparatus for optical signals. For example, the transmission apparatus corresponds to the optical transmitters 2, 2*a*, and 2*b* of the embodiments, and the receiving apparatus corresponds to the optical receiver 3 of the embodiments. The transmission apparatus includes a pre-equalization unit, a digital-to-analog conversion unit, and an output unit. For example, the digital-to-analog conversion unit corresponds to the DAC 24 of the embodiments, and the output unit corresponds to the optical front end unit 25 of the embodiments. The pre-equalization unit performs pre-equalization on transmission signals by using a compensation filter. The digital-to-analog conversion unit converts the transmission signals which have been pre-equalized from digital signals into analog signals. The output unit converts the transmission signals of the analog signals from electrical signals into optical signals and outputs the converted optical signals. The receiving apparatus includes a receiving unit, an analog-to-digital conversion unit, and a demodulation unit. For example, the receiving unit corresponds to the optical front end unit 31 of the embodiments. The receiving unit receives the optical signals which have been output from the output unit of the transmission apparatus and converts the received optical signals into received signals of electrical signals. The analog-to-digital conversion unit converts the received signals from the analog signals into the digital signals. The demodulation unit demodulates the received signals of the digital signals.

The optical transmission system further includes a scale estimation unit, a scale unit, a coefficient estimation unit, and an output amplitude level determination unit. The scale estimation unit calculates a slope near an amplitude 0 in a correlation between an amplitude distribution of the transmission signals which have been pre-equalized by the pre-equalization unit of the transmission apparatus and an amplitude distribution of the received signals of the digital signals in the receiving apparatus. The scale unit scales an amplitude of the received signals of the digital signals on the basis of the slope which has been calculated by the scale estimation unit. The coefficient estimation unit calculates a filter coefficient of the compensation filter used by the pre-equalization unit of the transmission apparatus on the basis of the transmission signals which have been pre-equalized by the pre-equalization unit of the transmission apparatus and the received signals which have been scaled by the scale unit of the receiving apparatus. The output amplitude level determination unit determines an output level of the transmission signals from the analog-to-digital conversion unit of the transmission apparatus on the basis of a correlation between a distribution of amplitudes of the transmission signals which have been input to the pre-equalization unit and a distribution of amplitudes of the transmission signals which have been pre-equalized by the pre-equalization unit.

The transmission apparatus may further include a clipping unit that clips the transmission signals which have been pre-equalized by the pre-equalization unit at the output levels which have been determined by the output amplitude level determination unit. The transmission apparatus may further include a scale unit that scales the transmission signals to be input to the pre-equalization unit on the basis of a ratio clipped by the clipping unit.

Although embodiments of the present invention have been described in detail with reference to the drawings so far, specific configurations are not limited to these embodiments and include designs and the like without departing from the scope of the invention.

REFERENCE SIGNS LIST

1, 1a, 1b Optical transmission system
2, 2a, 2b Optical transmitter
3 Optical receiver
4 Optical transmission line
21 Symbol mapping unit
22 Spectral shaping unit
23 Pre-equalization unit

12

24 Digital-to-analog converter
25, 31 Optical front end unit
26, 26a, 26b Output amplitude level determination unit
32 Analog-to-digital converter
33 Demodulation unit
34 Scale estimation unit
35, 61 Scale unit
36 Coefficient estimation unit
41 Optical fiber
42 Optical amplifier
51 Clipping unit

The invention claimed is:

1. An optical transmission system comprising:
a transmission apparatus; and
a receiving apparatus, wherein:
the transmission apparatus includes
a pre-equalizer that performs pre-equalization on digital transmission signals by using a compensation filter,
a digital-to-analog converter that converts the digital transmission signals which have been pre-equalized from digital signals into analog signals, so as to output analog transmission signals, and
an electrical-to-optical converter that converts the analog transmission signals from electrical signals into optical signals so as to output optical transmission signals;
the receiving apparatus includes
a receiver that receives the optical transmission signals which have been output from the output unit electrical-to-optical converter, converts the optical transmission signals from the optical signals into the electrical signals so as to output analog received signals,
an analog-to-digital converter that converts the analog received signals from the analog signals into the digital signals so as to output digital received signals, and
a demodulator that demodulates the digital received signals; and
the optical transmission system further includes
a scale estimation processor that calculates a slope near an amplitude 0 in a correlation between an amplitude distribution of the digital transmission signals which have been pre-equalized by the pre-equalizer and an amplitude distribution of the digital received signals,
a scale processor that scales an amplitude of the digital received signals on the basis of the slope which has been calculated by the scale estimation processor,
a coefficient estimation processor that calculates a filter coefficient of the compensation filter on the basis of the digital transmission signals which have been pre-equalized by the pre-equalizer and the digital received signals which have been scaled by the scale processor, and
an output amplitude level determination processor that determines an output level of the analog transmission signals output from the digital-to-analog converter on the basis of a correlation between a distribution of amplitudes of the digital transmission signals before being pre-equalized by the pre-equalizer and a distribution of amplitudes of the digital transmission signals which have been pre-equalized by the pre-equalizer.

2. A transmission apparatus comprising:
a pre-equalizer that performs pre-equalization on digital transmission signals by using a compensation filter;
a digital-to-analog converter that converts the digital transmission signals which have been pre-equalized from digital signals into analog signals so as to output analog transmission signals;

an electrical-to-optical converter that converts the analog transmission signals from electrical signals into optical signals so as to output optical transmission signals; and an output amplitude level determination processor that determines output levels of the analog transmission signals output from the digital-to-analog converter on the basis of a correlation between a distribution of amplitudes of the digital transmission signals before being pre-equalized by the pre-equalizer and a distribution of amplitudes of the digital transmission signals which have been pre-equalized by the pre-equalizer.

3. The transmission apparatus according to claim 2, wherein:

a receiving apparatus that has received the optical transmission signals which have been output from the electrical-to-optical converter converts the received optical transmission signals from the optical signals into the electrical signals so as to output received signals and scales the received signals on the basis of a slope near an amplitude 0 in a correlation between an amplitude distribution of the digital transmission signals which have been pre-equalized by the pre-equalizer and an amplitude distribution of the received signals; and the pre-equalizer sets, to the compensation filter, a filter coefficient calculated on the basis of the digital transmission signals which have been pre-equalized by the pre-equalizer and the received signals which have been scaled.

4. The transmission apparatus according to claim 2, further comprising a clipper that clips the digital transmission signals which have been pre-equalized by the pre-equalizer at the output levels which have been determined by the output amplitude level determination processor.

5. The transmission apparatus according to claim 4, further comprising a scale processor that scales the digital transmission signals before being pre-equalized by the pre-equalizer on the basis of a ratio clipped by the clipper.

6. A receiving apparatus comprising:

a converter that receives optical transmission signals which have been output from a transmission apparatus and converts the received optical transmission signals from optical signals ef into electrical signals so as to output analog received signals;

an analog-to-digital converter that converts the analog received signals from analog signals into digital signals so as to output digital received signals;

a demodulator that demodulates the digital received signals;

a scale estimation processor that calculates a slope near an amplitude 0 in a correlation between an amplitude distribution of transmission signals which have been pre-equalized by a pre-equalizer of the transmission apparatus by using a compensation filter and an amplitude distribution of the digital received signals;

a scale processor that scales an amplitude of the digital received signals on the basis of the slope which has been calculated by the scale estimation processor; and a coefficient estimation processor that calculates a filter coefficient of the compensation filter on the basis of the transmission signals which have been pre-equalized by the pre-equalizer and the digital received signals which have been scaled by the scale processor.

* * * * *